US012533800B2

(12) United States Patent
Hafner et al.

(10) Patent No.: US 12,533,800 B2
(45) Date of Patent: Jan. 27, 2026

(54) TRAINING REINFORCEMENT LEARNING AGENTS TO LEARN FARSIGHTED BEHAVIORS BY PREDICTING IN LATENT SPACE

(71) Applicant: Google LLC, Mountain View, CA (US)

(72) Inventors: Danijar Hafner, London (GB); Mohammad Norouzi, Richmond Hil (CA); Timothy Paul Lillicrap, London (GB)

(73) Assignee: Google LLC, Mountain View, CA (US)

( * ) Notice: Subject to any disclaimer, the term of this patent is extended or adjusted under 35 U.S.C. 154(b) by 1135 days.

(21) Appl. No.: 17/103,827

(22) Filed: Nov. 24, 2020

(65) Prior Publication Data

US 2021/0158162 A1    May 27, 2021

Related U.S. Application Data

(60) Provisional application No. 62/941,538, filed on Nov. 27, 2019.

(51) Int. Cl.
*B25J 9/16*  (2006.01)
*G06F 18/211*  (2023.01)
(Continued)

(52) U.S. Cl.
CPC ............. *B25J 9/163* (2013.01); *G06F 18/211* (2023.01); *G06F 18/213* (2023.01); *G06F 30/27* (2020.01); *G06N 3/08* (2013.01)

(58) Field of Classification Search
CPC ......... B25J 9/163; G06F 18/211; G06F 30/27; G06F 18/213; G06F 18/214;
(Continued)

(56) References Cited

U.S. PATENT DOCUMENTS

2019/0244099 A1\* 8/2019 Schaul ................... G06N 3/044
2019/0354867 A1\* 11/2019 Czarnecki ............. G06N 3/006
(Continued)

FOREIGN PATENT DOCUMENTS

WO   WO-2018153807 A1 \* 8/2018 ............. G06N 3/006

OTHER PUBLICATIONS

Tingwu Wang et al., "Exploring Model-based Planning with Policy Networks," https://arxiv.org/abs/1906.08649. (Year: 2019).\*
(Continued)

*Primary Examiner* — David Yi
*Assistant Examiner* — Nicholas Shine
(74) *Attorney, Agent, or Firm* — Fish & Richardson P.C.

(57) ABSTRACT

Methods, systems, and apparatus, including computer programs encoded on a computer storage medium, for training an action selection policy neural network used to select an action to be performed by an agent interacting with an environment. In one aspect, a method includes: receiving a latent representation characterizing a current state of the environment; generating a trajectory of latent representations that starts with the received latent representation; for each latent representation in the trajectory: determining a predicted reward; and processing the state latent representation using a value neural network to generate a predicted state value; determining a corresponding target state value for each latent representation in the trajectory; determining, based on the target state values, an update to the current values of the policy neural network parameters; and determining an update to the current values of the value neural network parameters.

25 Claims, 6 Drawing Sheets

(51) Int. Cl.
  *G06F 18/213* (2023.01)
  *G06F 30/27* (2020.01)
  *G06N 3/08* (2023.01)
(58) Field of Classification Search
  CPC ..... G06F 18/24133; G06F 30/20; G06N 3/08; G06N 3/006; G06N 3/045; G06N 3/084; G06N 3/0895; G06N 3/09; G06N 3/091; G06N 3/092; G06N 3/094; G06N 3/096; G06N 3/098; G06N 3/0985; G05B 2219/39313
  See application file for complete search history.

(56) References Cited

U.S. PATENT DOCUMENTS

| | | | |
|---|---|---|---|
| 2019/0354869 A1* | 11/2019 | Warde-Farley | G06N 3/08 |
| 2020/0265305 A1* | 8/2020 | Budden | G06N 3/006 |
| 2020/0293883 A1* | 9/2020 | Budden | G06N 3/045 |
| 2020/0372366 A1* | 11/2020 | Badia | G06N 3/088 |
| 2021/0034970 A1* | 2/2021 | Soyer | G06N 3/063 |

OTHER PUBLICATIONS

Pengyu Cheng et al, "Straight-Through Estimator as Projected Wasserstein Gradient Flow," (Year: 2019).*
Alemi et al., "Deep variational information bottleneck," arXiv preprint arXiv:1612.00410, Dec. 2016, 19 pages.
Banijamali et al., "Robust locally-linear controllable embedding," International Conference on Artificial Intelligence and Statistics, Mar. 2018, 1751-1759.
Barth-Maron et al., "Distributed distributional deterministic policy gradients," arXiv preprint arXiv:1804.08617, Apr. 2018, 16 pages.
Beattie et al., "Deepmind lab," arXiv preprint arXiv:1612.03801, Dec. 2016, 11 pages.
Bellemare et al., "The arcade learning environment: An evaluation platform for general agents," Journal of Artificial Intelligence Research, Jun. 2013, 47:253-79.
Buckman et al., "Sample-efficient reinforcement learning with stochastic ensemble value expansion," Advances in Neural Information Processing Systems, 2018, 31:8224-34.
Buesing et al., "Learning and querying fast generative models for reinforcement learning," arXiv preprint arXiv:1802.03006, Feb. 2018, 15 pages.
Byravan et al., "Imagined value gradients: Model-based policy optimization with tranferable latent dynamics models," Conference on Robot Learning, May 2020, 566-589.
Castro et al., "Dopamine: A research framework for deep reinforcement learning," arXiv preprint arXiv:1812.06110, Dec. 2018, 22 pages.
Chua et al., "Deep reinforcement learning in a handful of trials using probabilistic dynamics models," Advances in Neural Information Processing Systems, 2018, 4754-4765.
Clevert et al., "Fast and accurate deep network learning by exponential linear units," arXiv preprint arXiv:1511.07289, Nov. 2015, 14 pages.
Dillon et al., "Tensorflow distributions," arXiv preprint arXiv:1711.10604, Nov. 2017, 13 pages.
Doerr et al., "Probabilistic recurrent state-space models," arXiv preprint arXiv:1801.10395, Jan. 2018, 16 pages.
Ebert et al., "Self-supervised visual planning with temporal skip connections," arXiv preprint arXiv:1710.05268, Oct. 2017, 13 pages.
Eslami et al., "Neural scene representation and rendering," Science, Jun. 2018, 360(6394):1204-10.
Espeholt et al., "Impala: Scalable distributed deep-rl with importance weighted actor-learner architectures," arXiv preprint arXiv:1802.01561, Feb. 2018, 22 pages.
Feinberg et al., "Model-based value estimation for efficient model-free reinforcement learning," arXiv preprint arXiv:1803.00101, Feb. 2018, 12 pages.
Foerster et al., "Dice: The infinitely differentiable monte-carlo estimator," arXiv preprint arXiv:1802.05098, Feb. 2018, 10 pages.
Gelada et al., "Deepmdp: Learning continuous latent space models for representation learning," arXiv preprint arXiv:1906.02736, Jun. 2019, 31 pages.
Gregor et al., "Shaping belief states with generative environment models for rl," Advances in Neural Information Processing Systems, 2019, 32:13475-87.
Guo et al., "Neural predictive belief representations," arXiv preprint arXiv:1811.06407, Nov. 2018, 15 pages.
Gutmann et al., "Noise-contrastive estimation: A new estimation principle for unnormalized statistical models," Proceedings of the Thirteenth International Conference on Artificial Intelligence and Statistics, Mar. 2010, 297-304.
Ha et al., "World models," arXiv preprint arXiv:1803.10122, Mar. 2018, 21 pages.
Hafner et al., "Dream to control: Learning behaviors by latent imagination," arXiv preprint arXiv:1912.01603, Dec. 2019, 20 pages.
Hafner et al., "Learning latent dynamics for planning from pixels," International Conference on Machine Learning, May 201, 2555-2565.
Heess et al., "Learning continuous control policies by stochastic value gradients," Advances in Neural Information Processing Systems, 2015, 2944-2952.
Henaff et al., "Model-based planning with discrete and continuous actions," arXiv preprint arXiv:1705.07177, May 2017, 11 pages.
Henaff et al., "Model-predictive policy learning with uncertainty regularization for driving in dense traffic." arXiv preprint arXiv:1901.02705, Jan. 2019, 19 pages.
Hessel et al., "Rainbow: Combining improvements in deep reinforcement learning," Thirty-Second AAAI Conference on Artificial Intelligence, Apr. 2018, 8 pages.
Jaderberg et al., "Reinforcement learning with unsupervised auxiliary tasks," arXiv preprint arXiv:1611.05397, Nov. 2016, 14 pages.
Jordan et al., "An introduction to variational methods for graphical models," Learning in graphical models, 1998, 105-161.
Kaiser et al., "Model-based reinforcement learning for atari," arXiv preprint arXiv:1903.00374, Mar. 2019, 28 pages.
Kalman et al., "A new approach to linear filtering and prediction problems," Journal of Fluids Engineering, Mar. 1960, 11 pages.
Karl et al., "Deep variational bayes filters: Unsupervised learning of state space models from raw data," arXiv preprint arXiv:1605.06432, May 2016, 13 pages.
Kingma DP, Ba J. Adam: A method for stochastic optimization. arXiv preprint arXiv:1412.6980, Dec. 2014, 15 pages.
Kingma et al., "Auto-encoding variational bayes," arXiv preprint arXiv:1312.6114, Dec. 2013, 14 pages.
Krishnan et al., "Deep kalman filters," arXiv preprint arXiv:1511.05121, Nov. 2015, 17 pages.
Kurutach et al., "Model-ensemble trust-region policy optimization," arXiv preprint arXiv:1802.10592, Feb. 2018, 15 pages.
LeCun et al., "Backpropagation applied to handwritten zip code recognition," Neural computation, Dec. 1989, 1(4):541-51.
Lee et al., "Stochastic latent actor-critic: Deep reinforcement learning with a latent variable model," Advances in Neural Information Processing Systems, 2020, 12 pages.
Lillicrap et al., "Continuous control with deep reinforcement learning," arXiv preprint arXiv:1509.02971, Sep. 2015, 14 pages.
Lowrey et al., "Plan online, learn offline: Efficient learning and exploration via model-based control," arXiv preprint arXiv:1811.01848, Nov. 2018, 15 pages.
Machado et al., "Revisiting the arcade learning environment: Evaluation protocols and open problems for general agents," Journal of Artificial Intelligence Research, Mar. 2018, 61:523-62.
McAllester et al., "International Conference on Artificial Intelligence and Statistics," PMLR, Jun. 2020, 875-884.
Mnih et al., "Asynchronous methods for deep reinforcement learning," International Conference on Machine Learning, Jun. 2016, 1928-1937.

(56) References Cited

OTHER PUBLICATIONS

Mnih et al., "Human-level control through deep reinforcement learning," Nature, Feb. 2015, 518(7540):529-33.

Oh et al., "Value prediction network," Advances in Neural Information Processing Systems, 2017, 30:6118-28.

Oord et al., "Representation learning with contrastive predictive coding," arXiv preprint arXiv:1807.03748, Jul. 2018, 13 pages.

Parmas et al., "PIPPS: Flexible model-based policy search robust to the curse of chaos," International Conference on Machine Learning, Jul. 2018, 4065-4074.

Poole et al., "On variational bounds of mutual information," arXiv preprint arXiv:1905.06922, May 2019, 14 pages.

Rezende et al., "Stochastic backpropagation and approximate inference in deep generative models," arXiv preprint arXiv:1401.4082, Jan. 2014, 14 pages.

Schrittwieser et al., "Mastering atari, go, chess and shogi by planning with a learned model," arXiv preprint arXiv:1911.08265, Nov. 2019, 21 pages.

Schulman et al., "Proximal policy optimization algorithms," arXiv preprint arXiv:1707.06347, Jul. 2017, 12 pages.

Silver et al., "Deterministic policy gradient algorithms," Proceedings of the 31st International Conference on Machine Learning, 2014, 9 pages.

Silver et al., "Mastering the game of go without human knowledge," nature, Oct. 2017, 550(7676):354-9.

Srinivas et al., "Universal planning networks," arXiv preprint arXiv:1804.00645, Apr. 2018, 21 pages.

Sutton et al., "Dyna, an integrated architecture for learning, planning, and reacting," ACM Sigart Bulletin, Jul. 1991, 2(4):160-3.

Sutton et al., "Reinforcement learning: An introduction," MIT press, Oct. 2018, 10 pages.

Tassa et al., "Deepmind control suite," arXiv preprint arXiv:1801.00690, Jan. 2018, 24 pages.

Tishby et al., "The information bottleneck method," arXiv preprint physics0004057, Apr. 2000, 16 pages.

Wang et al., "Benchmarking model-based reinforcement learning," CoRR abs1907.02057, 2019, 25 pages.

Wang et al., "Exploring model-based planning with policy networks," arXiv preprint arXiv:1906.08649, Jun. 2019, 20 pages.

Watter et al., "Embed to control: A locally linear latent dynamics model for control from raw images," Advances in neural information processing systems, 2015, 2746-2754.

Weber et al., "Imagination-augmented agents for deep reinforcement learning," arXiv preprint arXiv:1707.06203, Jul. 2017.

Williams et al., "Simple statistical gradient-following algorithms for connectionist reinforcement learning," Machine learning, May 1992, 8(3-4):229-56.

Zhang et al., "Solar: Deep structured representations for model-based reinforcement learning," International Conference on Machine Learning, May 2019, 7444-7453.

* cited by examiner

TRAINING REINFORCEMENT LEARNING AGENTS TO LEARN FARSIGHTED BEHAVIORS BY PREDICTING IN LATENT SPACE

CROSS-REFERENCE TO RELATED APPLICATION

This application claims priority to U.S. Provisional Application No. 62/941,538, filed on Nov. 27, 2019. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a policy neural network that can be used to control a reinforcement learning agent interacting with an environment by selecting actions to be performed by the agent. In particular, the policy neural network can be used to select actions that enable the agent to accomplish different tasks. For example, the tasks can include causing the agent, e.g., a robot, to navigate to different locations in the environment, locate different objects, pick up different objects, or move different objects to one or more specified locations, to name just a few examples. In some cases, the tasks are long-horizon tasks that require the agent to select and perform thousands or millions of actions in a sequence in order to complete a task.

The subject matter described in this specification can be implemented in particular embodiments so as to realize one or more of the following advantages.

Training a policy neural network through reinforcement learning techniques to learn to select actions which improve total rewards to be received by an agent that is controlled by the network is usually problematic. First, the training process requires substantial computational resources (e.g., memory, computing power, or both) because in order to generate action selection outputs, the policy neural networks usually rely on observations of an environment which typically include high-dimensional sensor data. Therefore, the training process requires collecting and processing a large amount of high-dimensional data. Second, estimating total future rewards to be received by the agent upon performing the actions can be difficult, especially when the task is a long-horizon task that requires thousands or millions of actions. Inaccurate estimation of rewards may cause the policy neural network to select short-sighted actions which in turn leads to reduced total rewards to be received in the long term and decrease the likelihood that the task will be completed successfully.

This specification, however, describes training techniques that overcome the above problems. Briefly, the training process involves training a policy neural network for use in controlling the agent and training a value neural network that can estimate expected rewards to be received by the agent from the environment.

In particular, the neural networks are trained specifically based on latent representations. Compared to observations that include sensor data which is typically in high-dimensional spaces, the latent representations can represent the environment (including rewards and state transitions) in a more compact manner and therefore are more data-efficient. Accordingly, processing latent representations requires fewer computational resources both during training and after training, i.e., at run time.

In addition, the techniques prevent an agent from performing shortsighted actions (i.e., actions that hinder the agent from receiving greater rewards in a long term) by predicting long term effects of respective actions that would be performed by the agent when interacting with the environment. Specifically, the policy neural network can do so by generating long trajectories of latent representations that characterize simulated state transitions of the environment. Such farsighted prediction in turn allows the policy neural network to generate higher quality action selection outputs, e.g., action selection output that can be used to select optimal actions that maximize future rewards to be received by the agent.

In cases of training policy neural networks to learn to control real-world agents (e.g., robots or vehicles) to perform actions in real-world environments, the techniques can reduce the risk of damage, including wear or tear, to the agents because less actual interaction with the real-world environment is required when learning an effective control policy.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes a training system implemented as computer programs on one or more computers in one or more locations for training a policy neural network that can be used to control a reinforcement learning agent interacting with an environment by, at each of multiple time steps, processing a policy network input derived from data characterizing the current state of the environment at the time step (i.e., an "observation") to generate an action selection output specifying an action to be performed by the agent. In particular, the training system trains the policy network on latent representations generated by a representation neural network from observations. As used throughout this document, a "latent representation" of an observation refers to a representation of a state of the environment as an ordered collection of numerical values, e.g., a vector or matrix of numerical values, and generally has a lower dimensionality than the observation itself.

Figure 1:
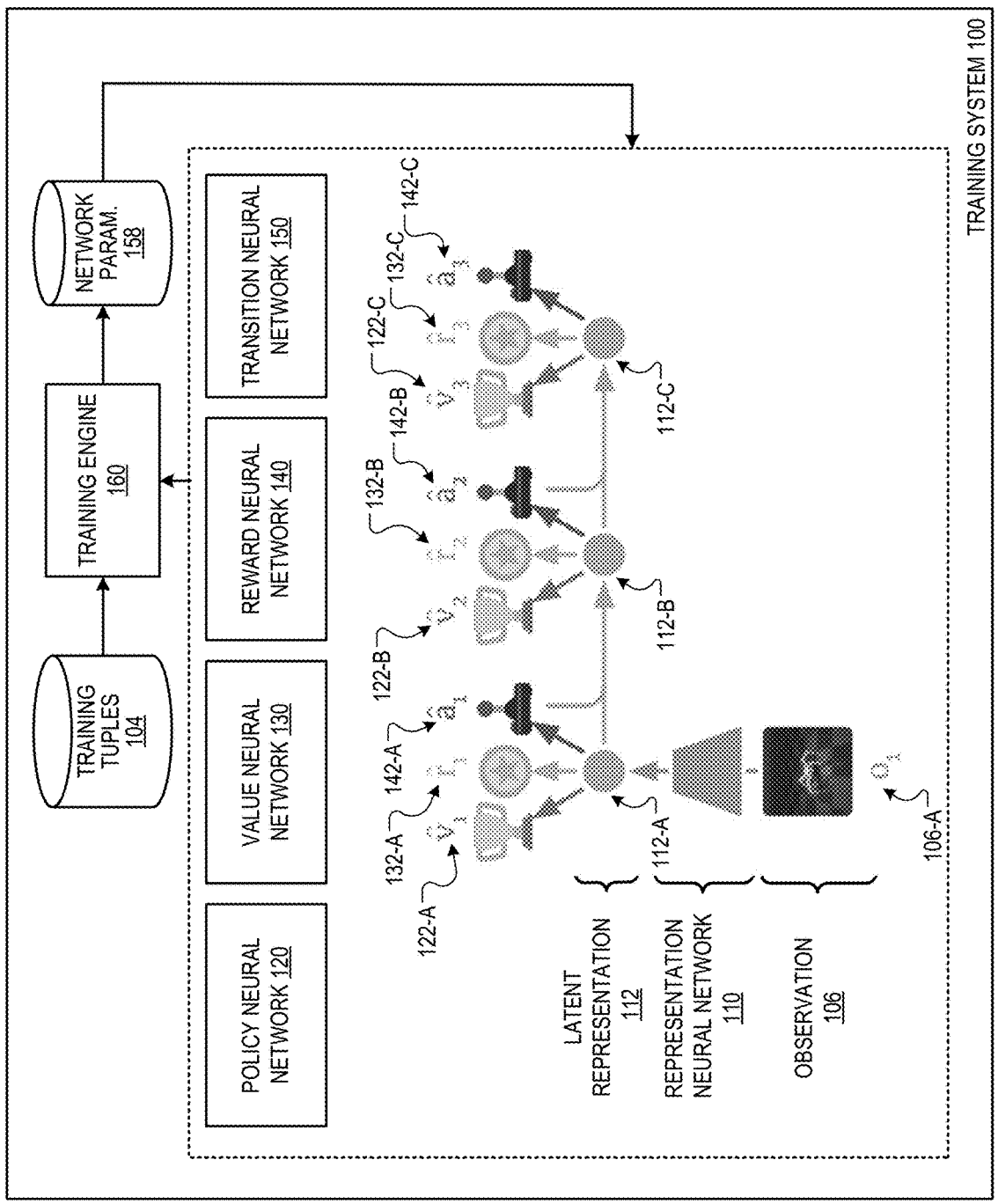
FIG. 1 shows an example training system.

FIG. 1 shows an example training system 100. The training system 100 is an example of a system implemented as computer programs on one or more computers in one or more locations in which the systems, components, and techniques described below are implemented.

The system 100 includes a representation neural network 110 that is configured to process a representation network input including a current observation, e.g., observation 106A, (i.e., an observation corresponding to a current state of an environment) to generate a latent representation, e.g., latent representation 112A, of the current observation. In some implementations, the representation network input also includes a latent representation of a preceding observation (i.e., an observation corresponding to a preceding state of the environment) and data specifying a preceding action performed by a reinforcement learning agent. While the observation 106 can typically include high-dimensional sensor data, e.g., image or video data, that characterizes a current state of an environment, the latent representation 112 of an observation can be represented as an ordered collection of numerical values, e.g., a vector or matrix of numerical values, and generally has a lower dimensionality than the observation itself. For example, each observation can be an image that has 64×64×3 pixels, whereas each latent representation can be a 30-dimensional array that specifies a probability distribution of a set of 30 possible latent variables. The representation neural network 110 can have any neural network architecture that enables it to perform its described function, e.g., an encoder-based convolutional neural network.

The system 100 includes a policy neural network 120 that is configured to process, at each of multiple time steps, a policy network input including a latent representation, e.g., latent representation 112A, to generate an action selection output that can be used to select an action, e.g., action 142A, that would be performed by the agent when the environment is in a state characterized by the latent representation. The policy neural network 120 can be implemented with any appropriate neural network architecture that enables it to perform its described function.

Once trained, the representation neural network 110 and the policy neural network 120 can be deployed and used to control the agent interacting with the environment, i.e., by generating a latent representation from each new observation and then selecting an action to be performed by the agent in response to the new observation using the action selection output generated from the latent representation. For example, the training system 100 provides, e.g., by a wired or wireless connection, the trained values of the network parameters 158 to an external system that can cause the agent to perform different actions, e.g., by directly transmitting control signals to the agent or by transmitting data identifying the actions to a control system for the agent. This is described in more detail below with reference to FIGS. 2-3.

In particular, the system 100 trains the policy neural network 120 by thoroughly predicting the effects of an arbitrary sequence of actions that would be performed by the agent. In particular, the training of the system involves generating a plurality of trajectories in a latent space that each characterizes a respective sequence of predicted state transitions of the environment caused by the actions that would be performed by the agent.

To generate each trajectory of latent representations, the system 100 makes use of a reward neural network 130, a value neural network 140, and a transition neural network 150. These neural networks are used to characterize, in the latent space, the dynamics of the environment being interacted with by the agent, including information about simulated transitions between different environment states and estimated rewards to be issued by the environment to the agent. Such information allows for the policy neural network 120 to be effectively trained mainly (or solely) through "latent imagination," i.e., by predicting ahead in the latent space and without the need of having to receive real observations or to carry out actions in real-world environments. This can ensure a low memory footprint and can facilitate rapid predictions of a large number, e.g., hundreds or thousands, of imagined trajectories in parallel.

In more detail, the system 100 iteratively uses the transition neural network 150 to generate an updated latent representation for inclusion in a corresponding trajectory of latent representations. The transition neural network 150 can be a recurrent neural network or any other autoregressive model that is configured to process (i) a latent representation, e.g., latent representation 112A, that characterizes a state of the environment in the latent space and (ii) an action, e.g., action 142A, that would be performed by the agent when the environment is in a state characterized by the latent representation and generate an updated latent representation, e.g., latent representation 112B, that characterizes a state that the environment would transition into if the agent performed the action.

Additionally, for each updated latent representation generated by using the transition neural network 150, the system 100 uses the policy neural network 120 to process the updated latent representation, e.g., latent representation 112B, to generate an action selection output from which an action, e.g., action 142B, can be selected. Specifically, the action corresponds to a proposed action that would be performed by the agent when the environment is in a state characterized by the received latent representation. The trajectory of latent representations generated in this way simulates state transitions of the environment that would be interacted with by the agent that is controlled by the policy neural network 120, and the training system 100 can repeatedly use the policy neural network 120 and transition neural network 150 to generate a plurality of trajectories that are typically different from one another, e.g., due to the inherent stochasticities in the estimation of state transitions and in the action selection process, and/or the exploration noise added to the action selection outputs. In some implementations, the training system 100 can do this in parallel, e.g., by using multiple instances of the policy neural network 120 and the transition neural network 150, e.g., at different computing units that can operate independently of each other. A computing unit may be, for example, a computer, a core within a computer having multiple cores, or other hardware or software within a computer capable of independently performing the required operations.

Once the plurality of trajectories have been generated, the training system 100 proceeds to determine, by using the reward neural network 140, a prediction of the rewards to be received by the agent in response to performing respective selected actions specified by each trajectory. The reward neural network 140 is configured to process a reward network input including a latent representation, e.g., latent representation 112B, to generate a reward network output that specifies a reward, e.g., reward 132B, to be received by the agent at the current state of the environment (characterized by the latent representation) and in response to performing a previously selected action, e.g., action 142A. For example, each reward can be specified by a scalar numerical value and characterizes, e.g., a progress of the agent towards completing an assigned task.

The training system 100 also determines, by using the value neural network 130, a prediction of respective state values of the latent representations that are included in each trajectory. Each state value, e.g., state value 122A, specifies a long-term time-adjusted, e.g., time-discounted, sum of predicted rewards that would be received by the agent by selecting actions using action selection outputs starting from the state characterized by the latent representation.

The example of FIG. 1 shows a total of three latent representations, i.e., latent representations 112A-112C, generated starting from a single observation, i.e., observation 106A, where each latent representation is associated with a corresponding state value, reward, and action, e.g., state value 122A, reward 132A, and action 142A, respectively. However, the state values, rewards, or actions need not be iteratively generated for every latent representation, and a different number of latent representations may be generated by the system than what is illustrated in FIG. 1.

A training engine 160 can train the neural networks to determine, e.g., from initial values, trained values of the network parameters 158, including respective network parameters of the representation neural network 110, policy neural network 120, value neural network 130, reward neural network 140, and transition neural network 150.

To assist in the training of the aforementioned neural networks, the training system 100 maintains a set of training tuples 104. Generally the set of training tuples 104 can be derived from experience information generated as a consequence of the interaction of the agent or another agent with the environment or with another instance of the environment for use in training the neural networks. Each piece of training tuple represents information about an interaction of the agent with the environment.

In some implementations, the training system 100 can initialize the training tuple set 104 with a predetermined number of training tuples that are generated based on controlling the agent to perform random actions in the environment.

In some implementations, each training tuple can include (i) a respective current observation characterizing a respective current state of the environment, (ii) a respective current action performed by the agent in response to the current observation, and (iii) a respective current reward received by the agent in response to the agent performing the respective current action. Optionally, each training tuple can also include a respective next observation characterizing a subsequent state of the environment, i.e., the state that the environment transitioned into as a result of the agent performing the respective current action in the training tuple.

In some other implementations, each training tuple can include (i) a respective current observation characterizing a respective current state of the environment, (ii) a respective preceding action performed by the agent, and (iii) a respective preceding latent representation characterizing a respective preceding state of the environment.

The training engine 160 selects different training tuples from the set of training tuples 104 and then trains, by using representation learning techniques, the representation neural network 110, the reward neural network 140, and the transition neural network 150 on the selected training tuples. In particular, the training engine 160 trains the neural networks to learn the dynamics of the environment including training the representation neural network 110 to generate high-quality (e.g., accurate, informative, or both) latent representations 112 from observations 106.

Either during or after the dynamics learning of the system, the training engine 160 trains, by using reinforcement learning techniques, the policy neural network 120 and the value neural network 130 on the "imagined" trajectory data generated using the representation, reward and transition neural networks and based on processing information contained in the training tuple set. In particular, the training engine 160 trains the policy neural network 120 to generate action selection outputs that can be used to select actions that maximize a cumulative measure of rewards received by the agent and that cause the agent to accomplish an assigned task.

The training of the neural networks is described in more detail below with reference to FIGS. 4-6.

Figure 2:
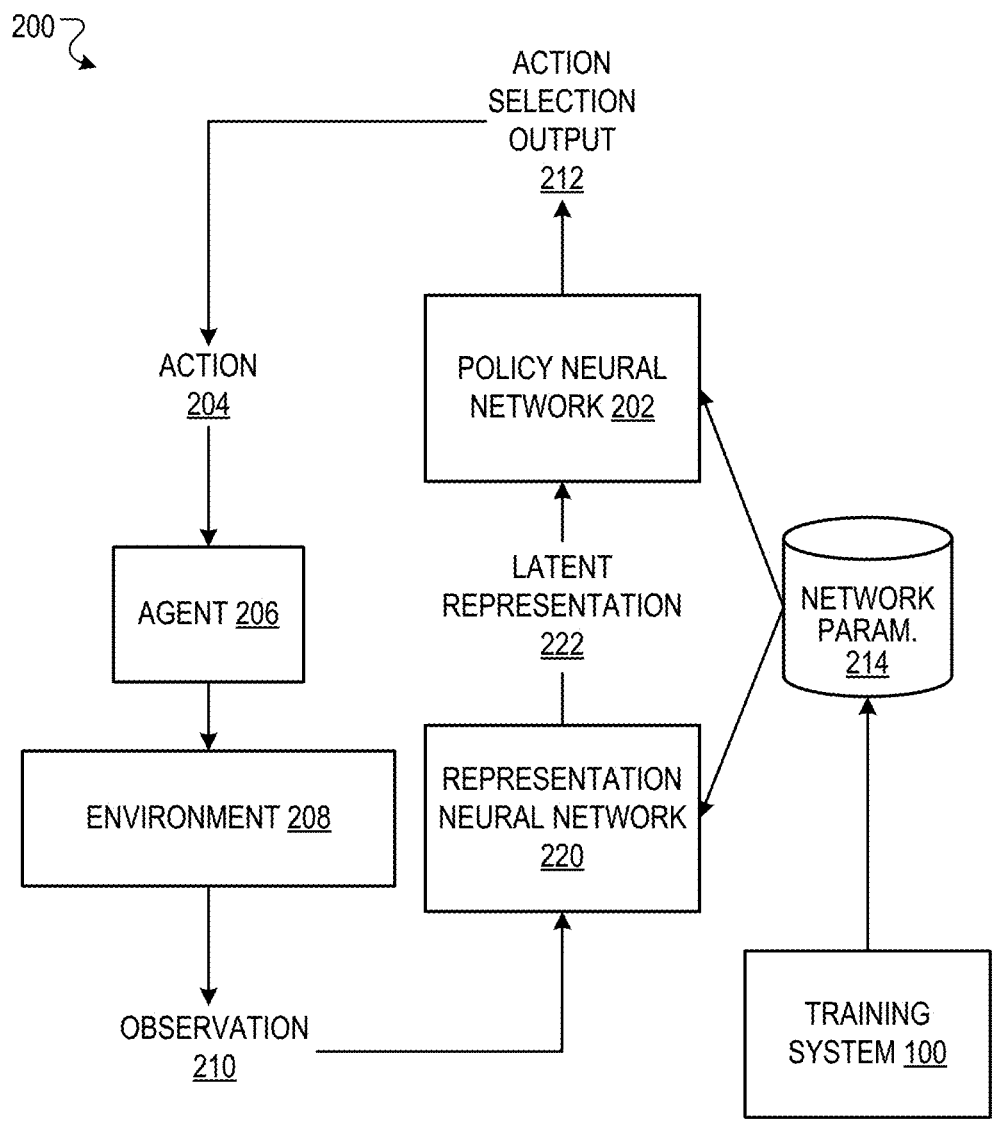
FIG. 2 illustrates an example data flow for using a policy neural network to select actions to be performed by an agent interacting with an environment.

FIG. 2 illustrates an example data flow for using a policy neural network to select actions to be performed by an agent interacting with an environment at each of multiple time steps.

At each time step, the representation neural network 220 processes an observation 210 characterizing the current state of the environment 208 in accordance with the current values of a set of its network parameters 214 ("representation network parameters") to generate a latent representation 222 of the observation 210. Generally, the latent representation of an observation can be represented as an ordered collection of numerical values, e.g., a vector or matrix of numerical values, and can have a lower dimensionality than the observation itself. The policy neural network 202 then processes the latent representation 222 in accordance with the current values of a set of its network parameters 214 ("policy network parameters") to generate an action selection output 212 that is used to select an action 204 to be performed by the agent 206 in response to the observation.

Figure 3:
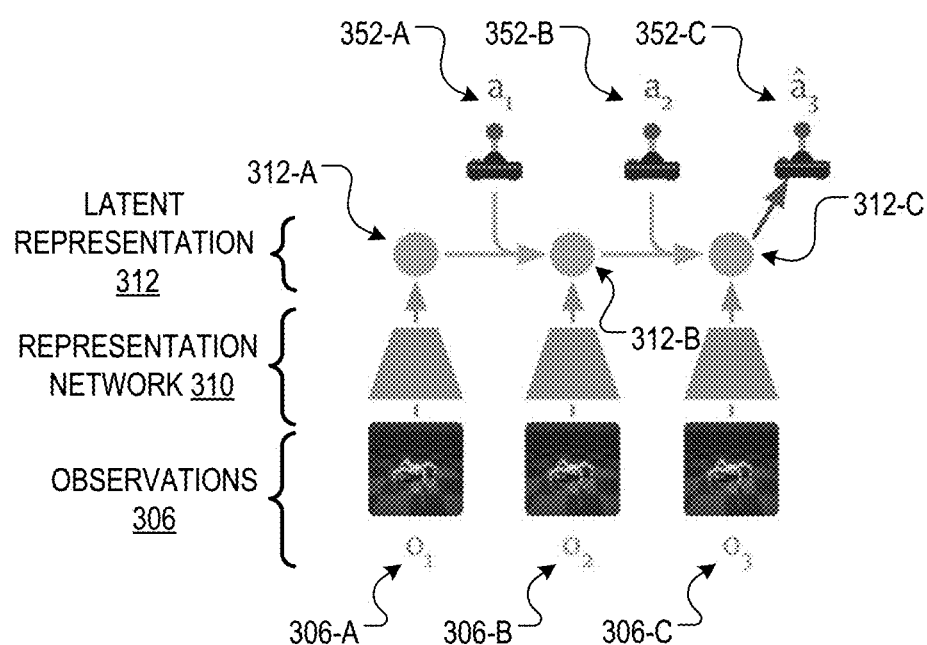
FIG. 3 is an example illustration of controlling an agent to interact with an environment.

FIG. 3 is an example illustration of controlling a reinforcement learning agent to interact with an environment. At each time step, the representation neural network 310 processes a current observation, e.g., observation 306A, which characterizes a current state of the environment to generate a latent representation, e.g., latent representation 312A, of the current observation. An action, e.g., action 352A, to be performed by the agent in response to the current observation can then be selected using a current action selection output generated by a policy neural network based on processing a current policy network input including the latent representation. In particular, during inference and as illustrated in the example FIG. 3, each received observation has a one-to-one correspondence with a latent representation. Note that this is different from training through latent imagination where each observation typically has a one-to-many correspondence with the latent representations, i.e., during training a sequence of multiple latent representations are generated from a single observation.

A few examples of the action selection output 212 are described next.

In one example, the action selection output 212 may include a respective numerical probability value for each action in a set of possible actions that can be performed by the agent. If being used to control the agent, the action to be performed by the agent could be selected, e.g., by sampling an action in accordance with the probability values for the actions, or by selecting the action with the highest probability value.

In another example, the action selection output 212 may directly define the action to be performed by the agent, e.g., by defining the values of torques that should be applied to the joints of a robotic agent.

In another example, the action selection output 212 may include a respective Q-value for each action in the set of possible actions that can be performed by the agent. If being used to directly control the agent, the Q-values could be processed (e.g., using a soft-max function) to generate a respective probability value for each possible action, which can be used to select the action to be performed by the agent (as described earlier). The action with the highest Q-value could also be selected as the action to be performed by the agent.

The Q value for an action is an estimate of a "return" that would result from the agent performing the action in response to the current observation 210 and thereafter selecting future actions performed by the agent 206 in accordance with current values of the policy network parameters.

A return refers to a cumulative measure of "rewards" received by the agent, for example, a time-discounted sum of rewards. The agent can receive a respective reward at each time step, where the reward is specified by a scalar numerical value and characterizes, e.g., a progress of the agent towards completing an assigned task.

At each time step, the state of the environment 208 at the time step (as characterized by the latent representation 222) depends on the state of the environment 208 at the previous time step and the action 204 performed by the agent 206 at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation, e.g., steering, and movement, e.g., braking and/or acceleration of the vehicle.

In some implementations the environment is a simulated environment and the agent is implemented as one or more computers interacting with the simulated environment. Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

In a further example the environment may be a chemical synthesis or a protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In some applications the agent may be a static or mobile software agent, i.e., a computer programs configured to operate autonomously and/or with other software agents or people to perform a task. For example the environment may be an integrated circuit routing environment and the system may be configured to learn to perform a routing task for routing interconnection lines of an integrated circuit such as an ASIC. The rewards (or costs) may then be dependent on one or more routing metrics such as an interconnect resistance, capacitance, impedance, loss, speed or propagation delay, physical line parameters such as width, thickness or geometry, and design rules. The observations may be observations of component positions and interconnections; the actions may comprise component placing actions, e.g., to define a component position or orientation and/or interconnect routing actions, e.g., interconnect selection and/or placement actions. The routing task may thus comprise placing components, i.e., determining positions and/or orientations of components of the integrated circuit, and/or determining a routing of interconnections between the components. Once the routing task has been completed an integrated circuit, e.g., ASIC, may be fabricated according to the determined placement and/or routing. Or the environment may be a data packet communications network environment, and the agent be a router to route packets of data over the communications network based on observations of the network.

Generally, in the case of a simulated environment, the observations may include simulated versions of one or more of the previously described observations or types of observations and the actions may include simulated versions of one or more of the previously described actions or types of actions.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility, e.g., to adjust or turn on/off components of the plant/facility.

In some further applications, the environment is a real-world environment and the agent manages distribution of tasks across computing resources, e.g., on a mobile device and/or in a data center. In these implementations, the actions may include assigning tasks to particular computing resources.

Optionally, in any of the above implementations, the observation at any given time step may include data from a previous time step that may be beneficial in characterizing the environment, e.g., the action performed at the previous time step, the reward received at the previous time step, and so on.

At each time step, the agent 206 can receive a reward (represented as a numerical value) based on the current state of the environment 208 (as characterized by the latent representation 222), the action 204 performed by the agent 206 at the time step, and the subsequent state of the environment after the agent performs the action.

Figure 4:
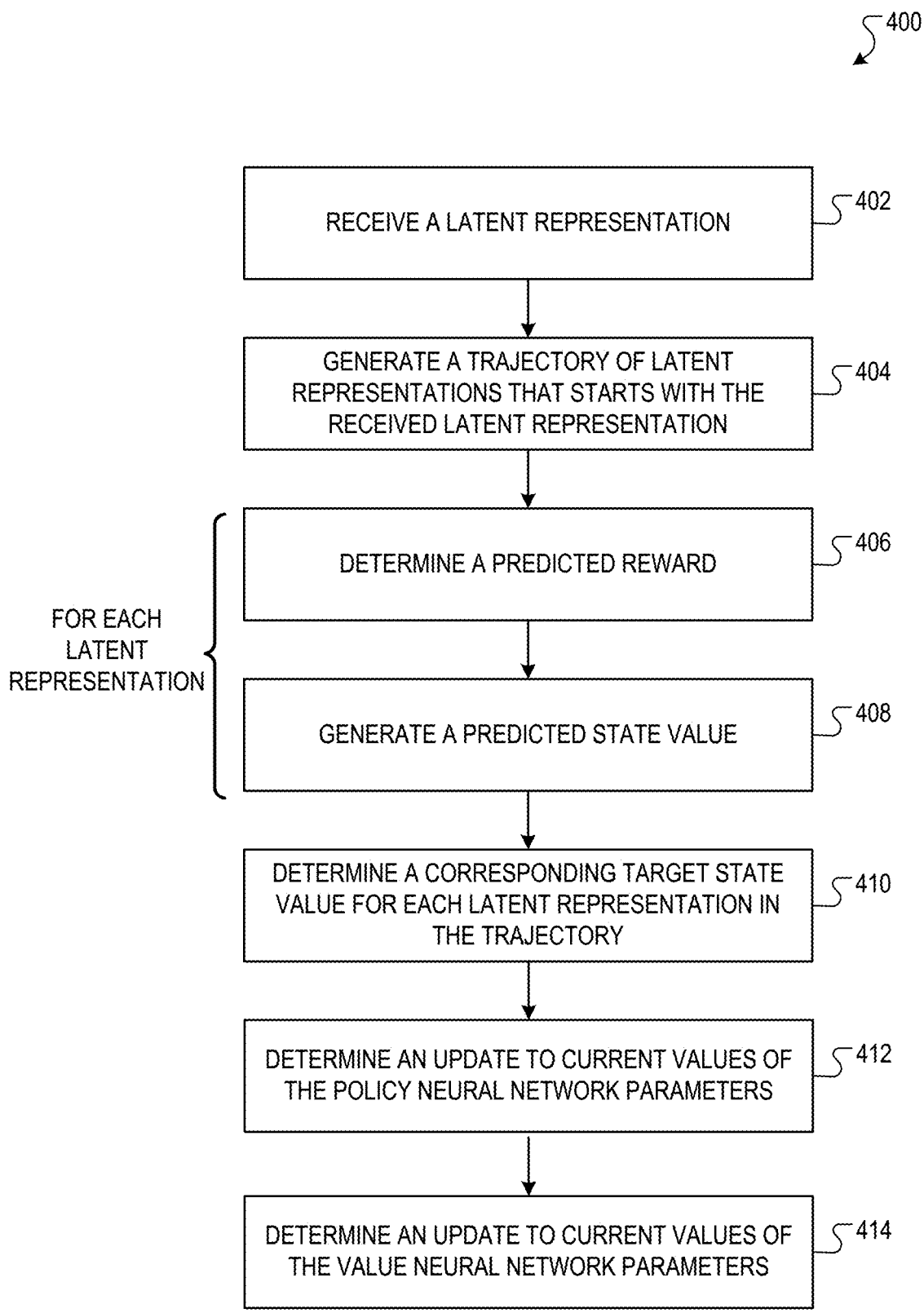
FIG. 4 is a flow diagram of an example process for training a policy neural network and a value neural network.

FIG. 4 is a flow diagram of an example process 400 for training a policy neural network and a value neural network. For convenience, the process 400 will be described as being performed by a system of one or more computers located in one or more locations. For example, a training system, e.g., the training system 100 of FIG. 1, appropriately programmed in accordance with this specification, can perform the process 400.

In general, the system can repeatedly perform the process 400 on different training tuples selected, e.g., through random sampling, from the set of training tuples which can be derived from the experience information generated as a consequence of the interaction of the agent or another agent with the environment or with another instance of the environment. In some implementations, each training tuple can include data specifying (i) a respective current observation characterizing a respective current state of the environment, (ii) a respective preceding action performed by the agent, and (iii) a respective preceding latent representation characterizing a respective preceding state of the environment.

The system receives a latent representation in a latent space and characterizing a current state of the environment (402). That latent representation can be generated by a representation neural network based on processing a representation network input including an observation (e.g., an image or a video frame) of the current state of the environment. The latent representation of the observation can be represented as an ordered collection of numerical values, e.g., a vector or matrix of numerical values, and generally has a lower dimensionality than the observation itself.

The system generates a trajectory of multiple latent representations that starts with the received latent representation (404). In brief, and as will be described in more detail below with reference to FIG. 5, generating each trajectory of latent representations can include repeatedly generating an action selection output by using the policy neural network, selecting an action that would be performed by the agent by using the action selection output, and then processing the current latent representation and the selected action using a transition neural network to generate an updated latent representation.

For each latent representation in the trajectory, the system determines a predicted reward (406) and determines a predicted state value (408) that represents a predicted value of the environment being in the state characterized by the latent representation in terms of a cumulative measure of predicted rewards to be received by the agent. For example, the predicted state value may specify a long-term time-adjusted, e.g., time-discounted, sum of predicted rewards that would be received by the agent by selecting actions using action selection outputs starting from the state characterized by the latent representation.

In more detail, for each latent representation in the trajectory, the system can determine the predicted reward by processing the latent representation using a reward neural network and in accordance with current values of a set of reward network parameters to generate a reward network output that specifies the predicted reward.

The system can determine the predicted state value by processing the latent representation using a value neural network and in accordance with current values of a set of value network parameters to generate a value network output that specifies the predicted state value.

The system determines a corresponding target state value for each latent representation in the trajectory (410) from the predicted rewards and the predicted state values for the latent representations in the trajectory. For each latent representation in the trajectory (referred to as a "current latent representation" below), the system can make this determination in any of a variety of ways.

In some implementations, the system can compute a sum of all predicted rewards received over H latent representations starting from a current latent representation and use the computed sum as the target state value, where H is a given (e.g., user-specified) positive integer. The sum can be an unweighted sum or a time-adjusted sum.

In some other implementations, the system can make this determination by factoring in predicted rewards to be received by the agent starting from an arbitrary step, which can be any step that is within or after the H steps. This allows the system to better account for the long-term rewards that would be received by the agent, e.g., distant future rewards to be received by the agent at states beyond the states characterized by the latent representations included in generated trajectories.

In such implementations, the system can determine one or more different values for a positive integer K and thereafter determine a respective candidate target state value for each of the values of K. The system can do this by, for each of the values of K: determining a time-adjusted (e.g., time-discounted) sum of the predicted rewards over H latent representations starting from a current latent representation, and then determining, by using the value neural network, an estimated state value for a latent representation that is H latent representations after the current latent representation. The respective H for any given latent representation can be a minimum of (i) a sum between a numeric position of the given latent representation in the trajectory and K, and (ii) a total number of latent representations in the trajectory.

In some such implementations, the system can determine the target state value by computing an exponentially-weighted average of the respective candidate target state values for the one or more values of K. This enables the system to balance the bias and variance that likely occur during the computation of the target state values.

In general, the system can repeatedly perform the steps 402-410 to generate multiple different trajectories including determining target state value information associated with the trajectories, e.g., until a predetermined number of trajectories have been generated. In some implementations, the system can do this in parallel, asynchronously, and/or in a decentralized manner, e.g., at different computing units that can operate independently of each other. A computing unit may be, for example, a computer, a core within a computer having multiple cores, or other hardware or software within a computer capable of independently performing the required operations for generating trajectory information.

The system then proceeds to use the target state values that have been determined for each trajectory of latent representations to determine updates to respective parameter values of the neural networks, as described in more detail below.

The system determines, based on the target state values, an update to the current values of the policy neural network parameters (412) that encourages the policy neural network to generate action selection outputs that result in actions being selected that improve the predicted state values. In other words, for each trajectory of latent representations, the system trains the policy neural network to generate action selection outputs that can be used to select actions that maximize, with respect to the corresponding target state values associated with the latent representations, a cumulative measure of predicted rewards to be received by the agent. In particular, the system can do this by computing analytic gradients of the target state values with respect to the policy network parameters, e.g., through stochastic backpropagation.

The system determines an update to the current values of the value neural network (414) parameters that encourages the value neural network to regress the corresponding target state values. The system can do this by evaluating, for each trajectory of latent representations, a value objective function that measures a difference between the predicted state values and the target state values, and thereafter computing a gradient of value objective function with respect to the value network parameters. For example, the difference can be computed as a mean squared error (MSE) difference.

In some implementations, the assigned task may be a complex task which requires selecting actions to be performed by the agent from a large discrete action space, a continuous action space, or a hybrid action space, i.e., with some sub-actions being discrete and others being continuous, and the action selection outputs of the policy neural network may parametrize a probability distribution over the entire action space. In such implementation, the system can determine the updates to network parameters by estimating the gradients through reparameterized sampling techniques, which view sampled actions as deterministically dependent on the action selection output of the policy neural network and allow for backpropagation of analytic gradients through the sampling operation.

In some implementations, the action space may be a discrete space, and the policy neural network and representation neural network may both be configured to generate discrete value outputs, i.e., discrete value action selection outputs and discrete value latent representations, respectively. In such implementations, the system can determine the updates to network parameters through straight-through gradient estimation techniques. This results in a biased gradient estimate with low variance, and thereby accelerates early stage training of the system.

The system then proceeds to apply the determined updates to policy and value network parameters by using an appropriate gradient descent optimization methods, e.g., stochastic gradient descent, RMSprop or Adam. Alternatively, the system only proceeds to update the current values of the network parameters once the process 400 have been performed for an entire mini-batch of selected training tuples. A mini-batch generally includes a fixed number of training tuples, e.g., 10, 20, or 50. In other words, the system combines, e.g., by computing a weighted or unweighted average of, respective gradients that are determined during the fixed number of iterations of the process 400 and proceeds to update the current network parameter values based on the combined gradient.

In general, the system can repeatedly perform the process 400 until a termination criterion is reached, e.g., after the process 400 have been performed a predetermined number of times or after the gradient has converged to a specified value.

Figure 5:
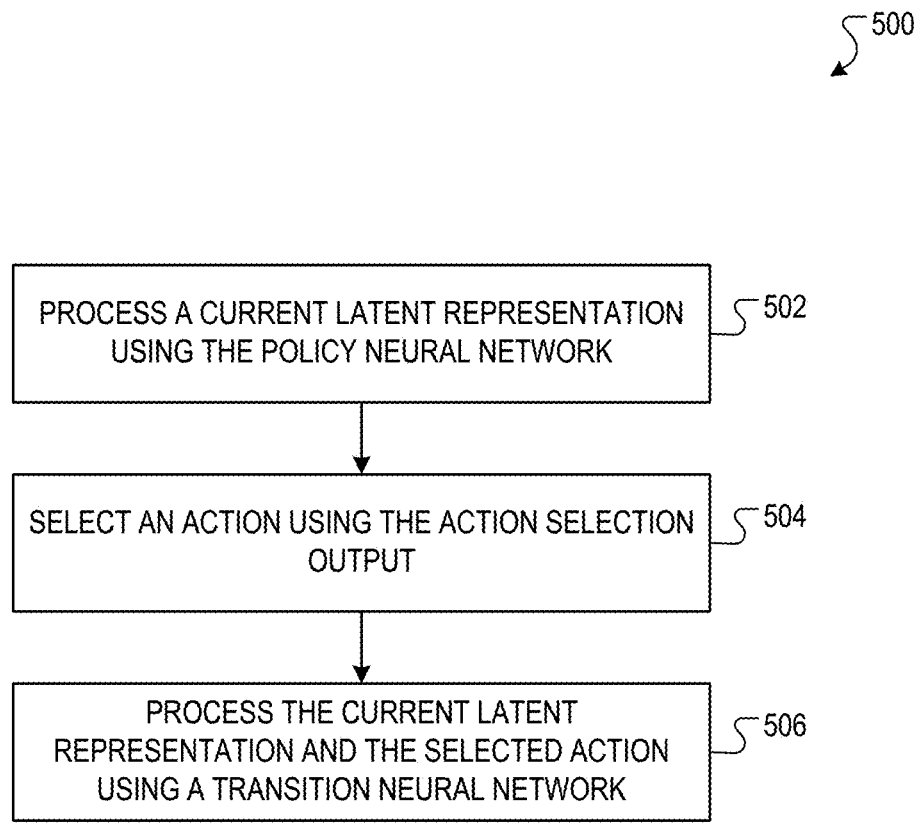
FIG. 5 is a flow diagram of an example process for generating a trajectory of latent representations.

FIG. 5 is a flow diagram of an example process 500 for generating a trajectory of latent representations. For convenience, the process 500 will be described as being performed by a system of one or more computers located in one or more locations. For example, a training system, e.g., the training system 100 of FIG. 1, appropriately programmed in accordance with this specification, can perform the process 500.

In general, the system can repeatedly perform the process 500 to generate a trajectory including multiple latent representations that starts with the received latent representation.

The system processes a current latent representation using the policy neural network and in accordance with current values of the policy neural network parameters to generate an action selection output (502). During training noise is added to the action selection output to facilitate action exploration. For example, the noise can be Gaussian distributed noise with an exponentially decaying magnitude.

The system selects, using the action selection output, an action that would be performed by the agent when the environment is in a state characterized by the current latent representation (504). Selecting the action by using the action selection output is similarly described above with reference to FIG. 2.

The system processes the current latent representation and the selected action using a transition neural network and in accordance with the current values of transition network parameters to generate an updated latent representation (506). The updated latent representation characterizes a state that the environment would transition into if the agent performed the selected action when the environment is in a state characterized by the current latent representation.

For example, the transition neural network may be configured as a recurrent neural network, and the system may use the transition neural network to receive a current transition network input including the current latent representation and the selected action and to update a current hidden state of the transition neural network by processing the received input, i.e., to modify the current hidden state of the transition neural network that has been generated by processing previous inputs by processing the current received input. The system may then use the updated hidden state to generate a current output which specifies the updated latent representation.

Prior to or during the training of the policy neural network and value neural network by performing processes 400 and 500, the system trains the representation neural network to encourage the generation of high-quality latent representations, e.g., latent representations that can capture salient (e.g., task-specific) information contained in observation of the environment, or latent representations that are predictive of subsequent states of the environment. The system also trains the transition neural network to more accurately simulate latent dynamics of the environment, i.e., state transitions of the environment that would be caused by the agent performing the proposed actions, and trains the reward neural network to more accurately estimate rewards that would be received by the agent from the environment in response to performing the proposed actions.

To this end, the system can determine trained parameter values of the neural networks by applying the plurality of training tuples as training data for these neural network and by using representation learning techniques, as described in more detail below.

Figure 6:
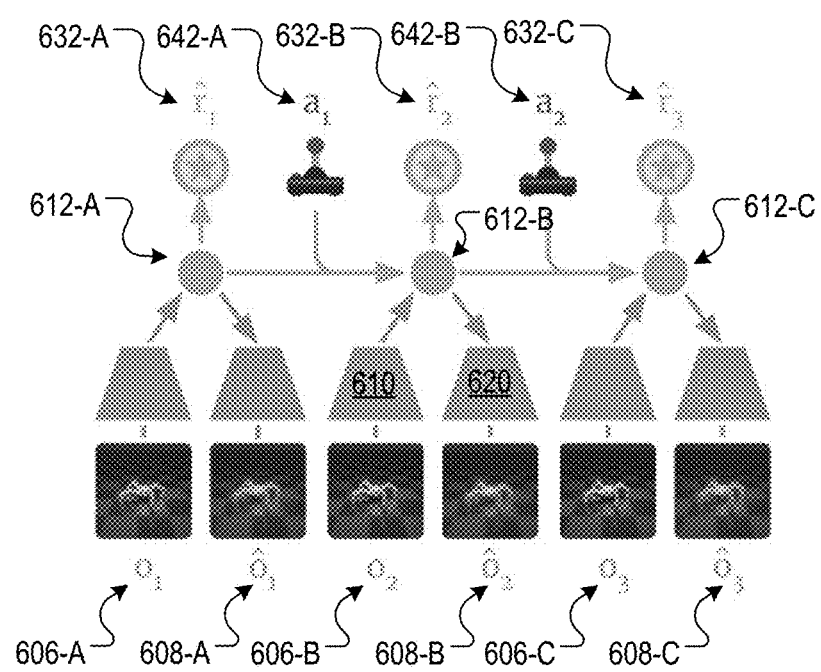
FIG. 6 is an example illustration of training a representation neural network, a reward neural network, and a transition neural network.

FIG. 6 is an example illustration of training a representation neural network, a reward neural network, and a transition neural network.

For each training tuple, the system processes, by using the representation neural network 610 and in accordance with current values of the representation network parameters, the training tuple, e.g., a training tuple including observation 606B, to generate a latent representation, e.g., latent representation 612B. The latent representation characterizes a current state of the environment into which the environment would transition, i.e., from the preceding state, if the preceding action, e.g., action 642A, specified in the training tuple were to be performed by the agent. When the training tuple is a first training tuple in each sequence of training tuples, the system can generate the current latent representation that characterizes an initial state of the environment by processing a current observation that is specified by the training tuple using the representation neural network.

Additionally, for each training tuple, the system processes the current latent representation, e.g., latent representation 612B, generated by the representation neural network to determine an estimation of a current reward, e.g., estimated reward 632B, to be received by the agent at the current state of the environment and in response to the agent performing the preceding action, e.g., action 642A. The system can do so by using the reward neural network and in accordance with current values of the reward network parameters.

For each training tuple, the system processes the preceding action, e.g., action 642A, performed by the agent and the preceding latent representation, e.g., latent representation 612A, that are specified by the training tuple to generate a current latent representation, e.g., latent representation 612B. The system can do so by using the transition neural network and in accordance with current values of the transition network parameters.

To provide richer training signals, in some implementations, the system also makes use of an observation neural network that is configured to process the latent representations, e.g., latent representation 612B, generated by the representation neural network to generate reconstructed observations, e.g., reconstructed observation 608B, emulating (or approximating) the original observations that characterize different states of the environment from which the latent representations are generated. For example, the observation neural network can have an architecture that performs operations that approximately invert the operations performed by the representation neural network described above with reference to FIG. 1.

The system then evaluates a representation learning objective function which measures a respective quality of each of the aforementioned network outputs, including the latent representation generated by the representation neural network, the reward estimation generated by the reward neural network, the latent representation generated by the transition neural network, and, in some implementations, the reconstructed observation generated by the observation neural network.

In general, the representation learning objective function can include any of a variety of components or terms that can be used to evaluate any of a variety of aspects of the quality of the network outputs. For example, the quality can be evaluated with respect to reward prediction, observation reconstruction, contrastive estimation, or a combination thereof. Reward prediction is described in more detail at J.

Schrittwieser, I. Antonoglou, T. Hubert, K. Simonyan, L. Sifre, S. Schmitt, A. Guez, E. Lockhart, D. Hassabis, T. Graepel, et al. Mastering atari, go, chess and shogi by planning with a learned model. arXiv preprint arXiv: 1911.08265, 2019, and at K. Gregor, D. J. Rezende, F. Besse, Y. Wu, H. Merzic, and A. v. d. Oord. Shaping belief states with generative environment models for rl. arXiv preprint arXiv:1906.09237, 2019. Image reconstruction is described in more detail at D. Hafner, T. Lillicrap, I. Fischer, R. Villegas, D. Ha, H. Lee, and J. Davidson. Learning latent dynamics for planning from pixels. arXiv preprint arXiv: 1811.04551, 2018. Contrastive estimation is described in more detail at A. v. d. Oord, Y. Li, and O. Vinyals. Representation learning with contrastive predictive coding. arXiv preprint arXiv:1807.03748, 2018.

The system determines, based on computing a gradient of the representation learning objective function with respect to the representation network parameters, an update to current values of the representation network parameters. The system also determines, based on computing respective gradients of the representation learning objective function with respect to the reward network parameters and the transition network parameters, respective updates to current values of the reward neural network parameters and the transition neural network parameters. In implementations where the observation neural network is used, the system also computes a gradient of the representation learning objective function with respect to the observation network parameters and thereafter backpropagates the gradient into the parameters of other neural networks.

The system then proceeds to apply the determined updates to respective parameters of the representation neural network, reward neural network, transition neural network, and, optionally, the observation neural network, as similarly described above with reference to FIG. 4.

In some implementations, the system can interleave the training of the neural networks with the control of the agent in performing one or more actual tasks while interacting with the environment. This allows the system to generate and add new experience data to the training tuple set that can thereafter be used in the subsequent training of the system. For example, at certain points during the training process, e.g., upon determining that a predetermined number of iterations of processes 400 and 500 have been performed, the system can use the policy neural network and the representation neural network and in accordance with current values of their parameters (as of the iteration) to control the agent to perform a sequence of actions when interacting with the environment, i.e., by generating a latent representation from each new observation and then selecting an action to be performed by the agent in response to the new observation using the action selection output generated from the latent representation.

An example algorithm for training the policy neural network together with other trainable components of the system is shown below.

---
Algorithm 1: Dreamer
---

Initialize dataset $\mathcal{D}$ with S random seed episodes.
Initialize neural network parameters $\theta$, $\phi$, $\psi$ randomly.
while not converged do
   for update step c = 1 .. C do
     // Dynamics learning Draw B sequences $\{(a_t, o_t, r_t)\}_{t=k}^{k+L} \sim \mathcal{D}$.

---
Algorithm 1: Dreamer
---

Compute model states $s_t \sim p_\theta (s_t \mid s_{t-1}, a_{t-1}, o_t)$.
Update $\theta$ using representation learning.
// Behavior learning Imagine trajectories $\{(s_\tau, a_\tau)\}_{\tau=t}^{t+H}$ from each $s_t$.

Predict rewards $E(q_\theta (r_\tau \mid s_\tau))$ and values $v_\psi(s_\tau)$.
Compute value estimates $V_\lambda(s_\tau)$ Update $\phi \leftarrow \phi + \alpha \nabla_\phi \sum_{\tau=t}^{t+H} V_\lambda(s_\tau)$.

Update $\psi \leftarrow \psi - \alpha \nabla_\psi \sum_{\tau=t}^{t+H} \frac{1}{2} \|v_\psi(s_T) - V_\lambda(s_T)\|^2$.

// Environment interaction
$o_1 \leftarrow$ env.reset( )
for time step t = 1 .. T do
   Compute $s_t \sim p_\theta (s_t \mid s_{t-1}, a_{t-1}, o_t)$ from history.
   Compute $a_t \sim q_\phi(a_t \mid s_t)$ with the action model.
   Add exploration noise to action.

Add experience to dataset $\mathcal{D} \leftarrow D \cup \{(o_t, a_t, r_t)_{t=1}^T\}$.

---

Model Components
   Representation: $p_\theta (s_t \mid s_{t-1}, a_{t-1}, o_t)$
   Transition: $q_\theta (s_t \mid s_{t-1}, a_{t-1})$
   Reward: $q_\theta (r_t \mid s_t)$
   Action: $q_\phi (a_t \mid s_t)$
   Value: $v_\psi (s_t)$
Hyper Parameters
   Seed episodes: S
   Collect interval: C
   Batch size: B
   Sequence length: L
   Imagination horizon: H
   Learning rate: $\alpha$ In the example algorithm shown above, each model component may be configured as a respective neural network with a suitable architecture, where the representation neural network, transition neural network, and reward neural network may share a common set of network parameters $\theta$. $o_t$, $s_t$, $a_t$, and $r_t$ stand for observation, latent representation of the observation, selected action, and reward, respectively, at time step t. Computing value estimates during "behavior learning" can be done using techniques similarly described above with reference to step 410 of process 400.

Notably, while some of the networks are trained using real data or data derived from the real data, the policy neural network and the value neural network can be mainly (or solely) trained through latent imagination with minimal utilization of real data. This greatly reduces the amount of real data and equipment or human labor costs associated with data collection that are otherwise required for training the policy neural network to achieve the state-of-the-art when deployed and used in controlling an agent to perform different tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a policy neural network having a plurality of policy neural network parameters used to select actions to be performed by an agent to control the agent in an environment, the method comprising:

obtaining an initial observation that characterizes an initial state of the environment;

processing at least the initial observation by using a representation neural network having a plurality of representation neural network parameters to generate an initial latent representation that characterizes the initial state of the environment, wherein the initial latent representation is in a latent space;

generating a trajectory of latent representations that comprises a sequence of multiple latent representations that are in the latent space and that each characterize a different state of the environment, wherein the sequence of multiple latent representations start with the initial latent representation that characterizes the initial state of the environment, and wherein generating the trajectory of latent representations comprises, at each subsequent step that is after a beginning step in a plurality of steps:

processing a current latent representation that is generated by using a transition neural network and without processing any observation that characterizes any state of the environment using the policy neural network and in accordance with current values of the plurality of policy neural network parameters to generate an action selection output;

selecting, using the action selection output, an action that would be performed by the agent when the environment is in a current state characterized by the current latent representation; and processing the current latent representation that is generated by using the transition neural network and the action that is selected using the policy neural network and without processing any observation that characterizes any state of the environment using the transition neural network having a plurality of transition neural network parameters to generate an updated latent representation that is in the latent space and that characterizes a next state that the environment would transition into if the agent performed the selected action when the environment is in the current state characterized by the current latent representation;

for each latent representation in the sequence of multiple latent representations included in the trajectory that are in the latent space:

determining a predicted reward; and processing the latent representation and without processing any observation that characterizes any state of the environment using a value neural network having a plurality of value neural network parameters and in accordance with current values of the plurality of value neural network parameters to generate a predicted state value that represents a time-adjusted sum of predicted rewards that would be received by the agent by selecting actions using action selection outputs starting from a state characterized by the latent representation;
determining a target state value for each latent representation in the trajectory from the predicted rewards and the predicted state values for the latent representations in the trajectory;
training, based on the predicted state values that have been generated by using the value neural network from the latent representations in the latent space, the policy neural network to update the current values of the plurality of policy neural network parameters, wherein training the policy neural network comprises determining an update to the current values of the plurality of policy neural network parameters that encourages the policy neural network to generate action selection outputs that result in actions being selected that improve the predicted state values; and
training, based on the predicted state values that have been generated by using the value neural network from the latent representations in the latent space, the value neural network to update the current values of the plurality of value neural network parameters, wherein training the value neural network comprises determining an update to the current values of the plurality of value neural network parameters by optimizing a value objective function that measures a difference between the predicted state values and the target state values.

2. The method of claim 1, wherein determining the predicted reward comprises:
processing the latent representation using a reward neural network having a plurality of reward neural network parameters.

3. The method of claim 1, further comprising:
collecting experiences generated as a result of the agent interacting with the environment, wherein each experience comprises (i) a respective current observation characterizing a respective current state of the environment, (ii) a respective current action performed by the agent in response to the current observation, and (iii) a respective current reward received by the agent in response to the agent performing the respective current action.

4. The method of claim 3, further comprising:
generating a plurality of training tuples based on the experiences, each training tuple comprising (i) a respective current observation characterizing a respective current state of the environment, (ii) a respective preceding action performed by the agent, (iii) a respective preceding latent representation characterizing a respective preceding state of the environment;
for each training tuple:
generating, by processing the training tuple using the representation neural network, a current latent representation that characterizes a current state of the environment; and
determining, based on computing a gradient of a representation learning objective function with respect to the representation neural network parameters, an update to current values of the representation neural network parameters.

5. The method of claim 4, further comprising, when the training tuple is a first training tuple in the plurality of training tuples:
generating, by processing a current observation that is specified by the training tuple using the representation neural network, a current latent representation that characterizes an initial state of the environment.

6. The method of claim 4, wherein the representation learning objective function evaluates respective qualities of at least one of reward prediction, observation reconstruction, or contrastive estimation.

7. The method of claim 4, further comprising, for each training tuple:
generating, by processing the current latent representation that is generated by the representation neural network using the reward neural network, a current reward to be received by the agent in response to the agent performing the preceding action; and
generating, by processing the preceding action performed by the agent and the preceding latent representation that are specified by the training tuple using the transition neural network, an estimated current latent representation emulating the current latent representation generated by using the representation neural network and that characterizes the current state of the environment.

8. The method of claim 7, wherein determining the update to current values of the representation neural network further comprises:
determining, based on computing respective gradients of the representation learning objective function with respect to the reward neural network parameters and the transition neural network parameters, respective updates to current values of the reward neural network parameters and the transition neural network parameters.

9. The method of claim 1, further comprising, performing the following at each of a plurality of execution steps:
generating, by processing a respective training tuple using the representation neural network, a current latent representation that characterizes the current state of the environment;
generating, by processing the generated latent representation using the policy neural network, a current action selection output; and
controlling the agent to perform an action that is selected using the current action selection output, the action causing the environment to transition into a subsequent state.

10. The method of claim 9, wherein generating the action selection output further comprises:
adding exploration noise to the action selection output.

11. The method of claim 9, wherein controlling the agent to perform the action that is selected using the current action selection output further comprises:
receiving, from the environment and by the agent, a reward in response to the agent performing the current action; and
obtaining an updated observation characterizing the subsequent state of the environment.

12. The method of claim 11, further comprising:
generating a new experience by associating a current observation that is specified by the training tuple with the current action performed by the agent and with the reward received by the agent.

13. The method of claim 1, wherein determining the corresponding target state value for each latent representation in the trajectory comprises:
determining a respective candidate target state value for each of one or more values of K, comprising, for each of the values of K:
determining a time-adjusted sum of the predicted rewards over H latent representations starting from a current latent representation, and determining an estimated state value for a latent representation that is H latent representations after the current latent representation, wherein the respective H for any given latent representation equals a minimum of (i) a sum between a numeric position of the given latent representation in the trajectory and K, and (ii) a total number of latent representations in the trajectory, and wherein each value of K is a different positive integer.

14. The method of claim 1, wherein determining the corresponding target state value for each latent representation in the trajectory further comprises:

computing an exponentially-weighted average of the respective candidate target state values for the one or more values of K.

15. The method of claim 1, wherein training the policy neural network comprises computing gradients of the target state values with respect to the plurality of policy neural network parameters through reparameterized sampling techniques.

16. The method of claim 1, wherein training the policy neural network comprises computing gradients of the target state values with respect to the plurality of policy neural network parameters through straight-through gradient estimation techniques.

17. The method of claim 3, wherein collecting experiences generated as a result of the agent interacting with the environment comprises controlling the agent to perform random actions in the environment.

18. A system comprising one or more computers and one or more storage devices storing instructions that are operable, when executed by the one or more computers, to cause the one or more computers to perform operations for training a policy neural network having a plurality of policy neural network parameters used to select actions to be performed by an agent to control the agent in an environment, the operations comprising:

obtaining an initial observation that characterizes an initial state of the environment;

processing at least the initial observation by using a representation neural network having a plurality of representation neural network parameters to generate an initial latent representation that characterizes the initial state of the environment, wherein the initial latent representation is in a latent space;

generating a trajectory of latent representations that comprises a sequence of multiple latent representations that are in the latent space and that each characterize a different state of the environment, wherein the sequence of multiple latent representations start with the initial latent representation that characterizes the initial state of the environment, and wherein generating the trajectory of latent representations comprises, at each subsequent step that is after a beginning step in a plurality of steps:

processing a current latent representation that is generated by using a transition neural network and without processing any observation that characterizes any state of the environment using the policy neural network and in accordance with current values of the plurality of policy neural network parameters to generate an action selection output;

selecting, using the action selection output, an action that would be performed by the agent when the environment is in a current state characterized by the current latent representation; and processing the current latent representation that is generated by using the transition neural network and the action that is selected using the policy neural network and without processing any observation that characterizes any state of the environment using the transition neural network having a plurality of transition neural network parameters to generate an updated latent representation that is in the latent space and that characterizes a next state that the environment would transition into if the agent performed the selected action when the environment is in the current state characterized by the current latent representation;

for each latent representation in the sequence of multiple latent representations included in the trajectory that are in the latent space:

determining a predicted reward; and processing the latent representation and without processing any observation that characterizes any state of the environment using a value neural network having a plurality of value neural network parameters and in accordance with current values of the plurality of value neural network parameters to generate a predicted state value that represents a time-adjusted sum of predicted rewards that would be received by the agent by selecting actions using action selection outputs starting from a state characterized by the latent representation;

determining a target state value for each latent representation in the trajectory from the predicted rewards and the predicted state values for the latent representations in the trajectory;

training, based on the predicted state values that have been generated by using the value neural network from the latent representations in the latent space, the policy neural network to update the current values of the plurality of policy neural network parameters, wherein training the policy neural network comprises determining an update to the current values of the plurality of policy neural network parameters that encourages the policy neural network to generate action selection outputs that result in actions being selected that improve the predicted state values; and training, based on the predicted state values that have been generated by using the value neural network from the latent representations in the latent space, the value neural network to update the current values of the plurality of value neural network parameters, wherein training the value neural network comprises determining an update to the current values of the plurality of value neural network parameters by optimizing a value objective function that measures a difference between the predicted state values and the target state values.

19. A non-transitory computer storage medium encoded with instructions that, when executed by one or more computers, cause the one or more computers to perform operations for training a policy neural network having a plurality of policy neural network parameters used to select actions to be performed by an agent to control the agent in an environment, the operations comprising:

obtaining an initial observation that characterizes an initial state of the environment;

processing at least the initial observation by using a representation neural network having a plurality of representation neural network parameters to generate an initial latent representation that characterizes the initial state of the environment, wherein the initial latent representation is in a latent space;

generating a trajectory of latent representations that comprises a sequence of multiple latent representations that are in the latent space and that each characterize a different state of the environment, wherein the sequence of multiple latent representations start with the initial latent representation that characterizes the initial state of the environment, and wherein generating the trajectory of latent representations comprises, at each subsequent step that is after a beginning step in a plurality of steps:

processing a current latent representation that is generated by using a transition neural network and without processing any observation that characterizes any state of the environment using the policy neural network and in accordance with current values of the plurality of policy neural network parameters to generate an action selection output;

selecting, using the action selection output, an action that would be performed by the agent when the environment is in a current state characterized by the current latent representation; and processing the current latent representation that is generated by using the transition neural network and the action that is selected using the policy neural network and without processing any observation that characterizes any state of the environment using the transition neural network having a plurality of transition neural network parameters to generate an updated latent representation that is in the latent space and that characterizes a next state that the environment would transition into if the agent performed the selected action when the environment is in the current state characterized by the current latent representation;

for each latent representation in the sequence of multiple latent representations included in the trajectory that are in the latent space:

determining a predicted reward; and processing the latent representation and without processing any observation that characterizes any state of the environment using a value neural network having a plurality of value neural network parameters and in accordance with current values of the plurality of value neural network parameters to generate a predicted state value that represents a time-adjusted sum of predicted rewards that would be received by the agent by selecting actions using action selection outputs starting from a state characterized by the latent representation;

determining a target state value for each latent representation in the trajectory from the predicted rewards and the predicted state values for the latent representations in the trajectory;

training, based on the predicted state values that have been generated by using the value neural network from the latent representations in the latent space, the policy neural network to update the current values of the plurality of policy neural network parameters, wherein training the policy neural network comprises determining an update to the current values of the plurality of policy neural network parameters that encourages the policy neural network to generate action selection outputs that result in actions being selected that improve the predicted state values; and training, based on the predicted state values that have been generated by using the value neural network from the latent representations in the latent space, the value neural network to update the current values of the plurality of value neural network parameters, wherein training the value neural network comprises determining an update to the current values of the plurality of value neural network parameters by optimizing a value objective function that measures a difference between the predicted state values and the target state values.

20. The method of claim 1, wherein the agent is a mechanical agent and the environment is a real-world environment.

21. The method of claim 20, wherein the agent is a robot.

22. The method of claim 1, wherein the environment is a real-world environment of a service facility comprising a plurality of items of electronic equipment and the agent is an electronic agent configured to control operation of the service facility.

23. The method of claim 1, wherein the environment is a real-world manufacturing environment for manufacturing a product and the agent comprises an electronic agent configured to control a manufacturing unit or a machine that operates to manufacture the product.

24. The method of claim 1, wherein:

the current observation comprises high-dimensional sensor data; and the latent representation is a lower-dimensional representation of the current observation.

25. The system of claim 18, wherein:

the current observation comprises high-dimensional sensor data; and the latent representation is a lower-dimensional representation of the current observation.

* * * * *